3,107,226
CURABLE AND CURED RESINOUS PRODUCTS COMBINING EPOXY RESIN ESTERS AND ACIDIC ACRYLATE ESTER COPOLYMERS
Francis Ian Tonner, Cleveland, Ohio, and Gordon Frank Dison, Bodfari, near Denbigh, Wales, assignors to The Glidden Company, Cleveland, Ohio, a corporation of Ohio
No Drawing. Filed Jan. 15, 1960, Ser. No. 2,596
14 Claims. (Cl. 260—23)

This invention relates to cured and curable products prepared from a mixture of two different types of resinous products, one type consisting of esters of complex epoxy resins illustrated by but not confined to esters of the complex resinous products prepared from bisphenol and epichlorhydrin. The other type of resinous product which is combined with said epoxy esters is an acidic copolymer of ethylenically-unsaturated monocarboxylic acids such as methacrylic or acrylic acid, and acrylate-type esters, said copolymer preferably but not necessarily including mononuclear vinyl aromatic monomers such as styrene, vinyl toluene, alpha methyl styrene, etc. For clarity hereinafter the finished product obtained from said mixture of resinous products will be called the finished mixture, and the separate components making up the latter will be called the resinous epoxy esters and the acidic acrylate component respectively.

The finished mixtures are useful for a variety of purposes but the invention will be described mainly in connection with their use as baking-type coating compositions, mainly for use on metals as a finish coat as contrasted with a primer coat. Such metal-finishing coating compositions are outstanding in that they yield glossy films which can have high hardness and moderate cost. Certain of the coatings possess the unique quality of being easily retouched, patched or repaired practically without leaving visible evidence of said patching, repairing or retouching. This latter quality commends the coatings for use in the industrial finishing of metal appliances and other objects which are customarily finished on a production line. Because of the practically invisible retouchability of the coatings on such articles, rejections due to faulty finishing can be rendered negligible. This is, as will be apparent, a highly significant cost factor in the commercial production-line finishing of metal and other articles, particularly as here, the coating can be used as a one-coat finish on bare ferrous or other metals or on thermosetting resin substrates.

Accordingly, one object of the present invention is to provide novel curable and/or cured mixtures of the type described briefly hereinabove and described more fully hereinafter.

Another object is to provide an improved baking-type coating composition adapted particularly for the finishing of metal and other articles.

A further object is to provide an improved baking-type coating composition having the unusual quality of being easily and practically invisibly retouched, patched or repaired after being baked.

These and other objects will be apparent from the following detailed description of the invention.

THE RESINOUS EPOXY ESTERS

This component of the finished copolymers of the invention is prepared from complex resinous epoxy ethers sometimes called ethoxyline resins, epoxide alcohols or epoxyhydroxy polyether resins having alternating ether-linked residues derived for the example from polyol monomers and monomeric epihalohydrins, having terminal 1,2 epoxy groups and non-terminal hydroxy groups, and being free of reactive groups other than said epoxy and hydroxy groups. Commercial products which are presently available and which are illustrative of the resinous epoxy ethers are the Shell Chemical Company's Epon resins and the Ciba Company's Araldite resins. Most of these products are prepared from bisphenol and epichlorhydrin, but there is at least one commercial Epon resin (Epon 562, formerly Epon 812) which is prepared from glycerine (as the polyol) and epichlorhydrin. A more detailed description of these and other resinous epoxy ethers is presented hereinafter, but for the purposes of this paragraph the foregoing brief outline is sufficient to illustrate the kinds of resinous epoxy ethers herein contemplated for use in preparing the resinous epoxy ester component of the invention.

Resinous epoxy ethers of the type alluded to above are esterified by alcoholysis treatment with esters of desired modifying monocarboxylic aliphatic acids of 4–22 carbons and/or mixtures thereof so as to unite the said modifying acid(s) with about 12%–100% of the hydroxyl groups contained in the resinous epoxy ethers and so as to retain the 1,2 epoxy groups thereof substantially unesterified. The resulting esters are of course mixtures of esters.

The alcoholysis esters which are used to introduce the ester-linked modifying acids are simple alkyl esters composed of chemically-combined aliphatic monohydric alcohols having 1–5 carbons and the desired modifying acids identified above. Thus the esters can be the simple methyl, ethyl, propyl, isopropyl, butyl, isobutyl, amyl, etc. esters of the desired modifying acids, examples of the latter being any of the individual fatty acids found in natural oils of the coconut oil group, e.g. acids such as capric, caprylic caproic, lauric, myristic, palmitic, oleic, linoleic, stearic, etc., the natural mixture of acids found in oils of the coconut oil group, the individual acids or the naturally-occurring mixtures of acids found in oils such as castor oil or soya oil, or the individual or mixed acids secured from dehydrated castor oil. Thus the acids used for modifying purposes are of the hydrocarbyl or non-primary hydroxylated type but can be saturated, unsaturated or mixed saturated/unsaturated acids. Such acids containing 10–18 carbons are generally preferred.

In order to form the desired esters of the resinous epoxy ether, the latter are mixed with the simple alkyl esters of the selected acid(s) and with a small amount of appropriate alkaline esterification catalyst such as sodium hydroxide, potassium hydroxide, lime, potassium acetate, sodium acetate, calcium acetate, lithium hydroxide, lithium carbonate, or alkali metal alkoxides such as sodium methoxide, potassium methoxide, sodium ethoxide, etc. The mixture can be protected throughout the treatment with an inert gas such as nitrogen or carbon dioxide, and/or the mixture can be sparged with an inert gas. Sparging with carbon dioxide should be only moderate however, since the gas can react with the catalyst in some instances thereby gradually reducing the catalyst's effectiveness. The mixture is heated to about 400°–450° F. at atmospheric pressure and the alkanol(s) liberated by the reaction are removed. One can ultimately vacuum strip the said liberated alkanols so as to favor complete reaction, i.e. complete esterification of the desired modifying acids, but this has not been found to be necessary generally. At the conclusion of the treatment one can also vacuum strip any unreacted alkyl ester(s) used in the alcoholysis but we have found that said esters are useful in the finished coating compositions, where they function as solvents which help "flow" and compatibility. We therefore prefer to forego said stripping. The disclosure of U.S. Reissue Patent No. 24,047 is here incorporated by reference.

As indicated earlier herein, the alcoholyzing alkyl esters and the resinous epoxy ether in the alcoholysis mixture are proportioned so as to esterify between about 12% and 100% of the available hydroxyl groups in the resinous epoxy ether, preferably between about 25% and 75%. Since the Shell and Ciba resins are usually identified by both epoxy equivalent weights and esterification equivalent weights, or since these values can be determined experimentally, the available hydroxyls can be computed from these values; namely, the available hydroxyls are found by substracting twice the number of epoxy equivalents in the mixture from the number of esterification equivalents. Then the quantity of modifying acids in the forms of alkyl esters can be computed by making the available acids thereof equivalent to 12-100% of said hydroxyls.

The epoxide equivalent weight is determined by heating one gram sample of the polyepoxide with an excess of pyridinium chloride dissolved in pyridine at the boiling point for 20 minutes. The excess pyridinium chloride is then back titrated with 0.1 N sodium hydroxide to phenolphthalein end point. The epoxide value is calculated by considering one HCl as an equivalent of one epoxide. This method is used to obtain all epoxide values reported herein.

The resinous epoxy ethers which are used as starting materials for preparation of esters by alcoholysis have been outlined hereinabove but the following detailed description will indicate the scope thereof which is here contemplated.

THE STARTING EPOXY RESINS OR ALCOHOLS

The epoxy resins used as starting material in forming our epoxy esters are well known in the art. They are described in Castan Patents 2,324,483 and 2,444,333, British Patent 518,057 and British Patent 576,698. U.S. Patents 2,494,295, 2,500,600, and 2,511,913 also disclosed epoxy resins which can be used in connection with the present invention. The disclosures of the above patents are here incorporated by reference. Such epoxy alcohols used as starting materials herein and which are esterified to produce the epoxide esters are alcohols which contain terminal epoxide or glycidyl groups as well as intermediate esterifiable hydroxyl groups and which are produced from dihydric phenols by reaction with epichlorhydrin and caustic alkali or by the reaction of dihydric phenols with diepoxides to produce polyether derivatives of the dihydric phenol having terminal aliphatic epoxide groups. Such polyhydric alcohols containing terminal epoxide groups are epoxide resins and in general are polymeric products.

The epoxide esters are made from such epoxide alcohols by alcoholysis reaction with simple esters of the drying oil or other acids with readily volatile alcohols which are volatilized during the alcoholysis reaction. Esterification in this way brings about reaction between hydroxyl groups of the epoxide alcohol while leaving the epoxide groups in the epoxide ester product.

The epoxide resins which are advantageously used as the epoxide alcohols to produce the epoxide esters are preferably prepared by reacting a dihydric phenol with epichlorhydrin in alkaline solution. These products are in general of a resinous character and are glycidyl ethers of the dihydric phenols. Various dihydric phenols can be used in preparing these glycidyl ethers including mononuclear phenols such as resorcinol, etc., or polynuclear phenols such as bisphenol (p,p′-dihydroxydiphenyldimethyl methane) and other dihydroxydiaryldialkyl methanes, 1,5-dihydroxy naphthalene, etc.

The glycidyl ethers or epoxide resins are produced from the dihydric phenols by heating with epichlorhydrin in the presence of caustic alkali, using more than one mol of epichlorhydrin per mol of the dihydric phenol and up to around 2 mols of epichlorhydrin per mol of dihydric phenol and using an amount of caustic alkali somewhat in excess of that equivalent to the epichlorhydrin. The heating is continued to convert the product into a mixture of glycidyl ethers or epoxide ethers. The principal product may be represented by the following formula:

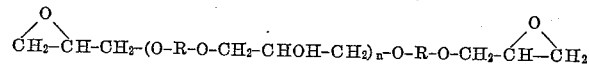

where R is the divalent hydrocarbon radical of the dihydric phenol, and $n$ is 1,2,3, etc.

The length of the chain and the extent of polymerization can be varied by changing the molecular proportions of epichlorhydrin and dihydric phenol from 2 epichlorhydrin to 1 dihydric phenol towards a ratio of 1 epichlorhydrin to 1 dihydric phenol as the latter ratio is approached, the molecular weight and the softening point of the epoxide resin or glycidyl ether is increased.

In general these epoxide ethers or glycidyl ethers contain terminal epoxide groups, and have alternating intermediate aliphatic hydroxyl-containing and aromatic nuclei linked through ether oxygen and with terminal 1, 2 epoxide-containing aliphatic groups.

The polyhydric epoxide resins which are to be subjected to esterification also include the reaction products of dihydric phenols with diepoxides such as diglycide ether, butadiene diepoxide, and the diepoxides and polyepoxides resulting from: (a) the reaction of polyhydric alcohol such as glycerol, etc. with epichlorhydrin to produce polychlorhydrin ethers of the ployhydric alcohol and (b) dehydrogenation of the polychlorhydrin ethers, e.g. with sodium aluminate, as described in United States Patent No. 2,538,072. Such epoxide resins also contain alternating nuclei or groups united through ether oxygen.

The following table gives pertinent data on Epon resins:

TABLE I

| Epon No. | Epoxide equivalent | Approximate esterification equivalent | M.P., °C. |
|---|---|---|---|
| 828 | 192 | 80 | 9 |
| 834 | 225– 290 | 105 | 20– 28 |
| 1001 | 450– 425 | 130–145 | 64– 76 |
| 1004 | 905– 985 | 175 | 97–103 |
| 1007 | 1,600–1,900 | 190 | 127–133 |
| 1009 | 2,400–4,000 | 200 | 145–155 |
| 1062 | 140– 165 |  | Liquid |
| 1064 | 300– 375 | 105 | 40– 45 |
| 562 | 120– 145 | 38– 48 | Liquid |

THE ACIDIC ACRYLATE COMPONENT

This component is formulated as follows:

TABLE I

|  | Limits (weight percent) | |
|---|---|---|
|  | Maximum | Preferred |
| Acrylic and/or substituted acrylic acid | 5–25 | 5–12 |
| Ester(s) of acrylic and/or methacrylic acids | 1–95 | 5–75 |
| Mononuclear vinyl aromatic monomer(s) | 0–90 | 19–83 |
| Total | 100 | 100 |

As will be noted, the vinyl aromatic monomer(s) are optional and can be omitted. We prefer however to include material of this class to provide modification in the film properties of the finished copolymer products and to lower costs. Our preferred acidic acrylate component for use with our preferred resinous epoxy esters (i.e., the hydrococonut oil acid esters of Epon 1001, 1002, or 1004) is formulated as follows:

| | Weight percent | | Variants |
|---|---|---|---|
| | Preferred | Useful | |
| Methacrylic acid about | 10 | 5-12 | Replace with acrylic. |
| Butyl methacrylate about | 17.5 | 20-40 | 20-40% of any $C_1$-$C_4$ alkyl esters of acrylic and/ or methacrylic acid. |
| Methyl methacrylate about | 17.5 | | |
| Styrene about | 55 | balance | Vinyl toluene. |
| Total | 100 | | |

The monohydric alcohol ester(s) of acrylic and/or substituted acrylic acid of Table I are substantially neutral monoesters of the indicated acids. The alcohol radicals found in such esters can be those secured from monohydric aliphatic hydrocarbyl alcohols of 1-22 carbons preferably 1-12 carbons, or polyhydric primary or secondary aliphatic polyols such as ricinoleyl alcohol, $C_2$-$C_8$ alkylene- or polyalkylene glycols, glycerine, sorbitol, pentaerythritol, etc. The preferred alcohols are saturated but can be either straight or branched chain types. We have found that the branched chain alcohol esters of methacrylic acid generally produce greater hardness in the finished copolymer of the invention. Pencil hardness values of 8-9 in the finished copolymer are not unusual particularly when the styrene or any equivalent vinyl monomer is omitted from the acidic component being described here. Instead of consisting wholly of esters of the above types the acrylate and/or methacrylate ester moiety can include up to about 35% (preferably up to 20%) by weight acrylic and/or methacrylic esters of glycol- or polyglycol-monohydrocarbyl ethers such as ethylene glycol monoethyl ether, diethylene glycol monomethyl ether, diethylene glycol monocyclohexyl ether, dipropylene glycol monobutyl ether, dibutylene monoethyl ether, etc. wherein the glycol radical can have 2-8 carbons and the ether-linked hydrocarbyl group can have 1-6 carbons. Similar glycol or polyglycol monophenyl ethers can also be used beneficially to prepare useful acrylic- and/or substituted acrylic acid esters.

The acids used in the here-described acidic acrylate component are preferably the $C_1$-$C_6$ hydrocarbyl-substituted and unsubstituted acrylic acids such as crotonic acid, methacrylic acid, cinnamic acid, ethacrylic acid, etc., with methacrylic acid being especially preferred. It will be understood that the acid(s) of this component are used to form cross links with the resinous epoxy esters after these two components have been mixed together and are finally baked or otherwise heat-cured in their mixed condition. Such use does not of course dictate the relative proportions of the two components employed in the mixture which is finally baked. Accordingly the amount of acid(s) can be varied in the present acidic acrylate component between about 5-25%, with 5-12% being preferred.

The vinyl aromatic monomers which can be used in preparing the acidic acrylate component of the invention are styrene, alpha methyl styrene, vinyl toluene and other ring-substituted homologues of styrene where the substituent groups are $C_1$-$C_4$ alkyl groups (preferably $C_1$-$C_2$) or halogens (chlorine preferred). The alkyl groups can be unsaturated, e.g. allyl groups.

In preparing the acidic acrylate component, the copolymerization of the various constituents thereof is catalyzed by any of a variety of addition-polymerization catalysts such as organic peroxides (e.g tertiary butyl perbenzoate, cyclohexanone peroxides, cumene hydroperoxide, ditertiary butyl peroxide, tertiary butyl hydroperoxide and tertiary butyl peracetate).

The polymerization is preferably but not necessarily initiated in a compatible organic non-reactive solvent. Such solvents include aromatics such as xylene, toluene, etc. and alcohols such as alkanols having 3-10 carbons, e.g. the propanols, the butanols, amyl alcohol, etc. Diethylene glycol monobutyl ether (butyl Carbitol) is also an effective solvent. When the latter or the alkanols are employed it is preferable costwise to use them in admixture with the aromatic solvents, with the latter constituting as much as can be tolerated compatibly with the finished resin being prepared.

The catalyst-induced polymerization reactions are highly exothermic. We have accordingly found it desirable to start by introducing a heel of solvent(s) or a heel of the uncatalyzed mixed monomers, and then heat the heel to reflux (in the case of a solvent heel) or to about 160°-325° F. The residue of mixed monomers is combined outside of the reaction vessel with the reaction catalyst(s) and then is added slowly to the heated heel in the vessel. The heating of the vessel can then be discontinued since the heat of reaction will thereafter maintain reaction conditions. The reaction vessel is desirably equipped with effective cooling means so that excessive temperatures can be avoided. Usually, however, one can find an appropriate rate of addition of the mixed and catalyzed monomers which (depending on the catalyst employed) will generate all the heat which is needed without requiring external cooling of the vessel. Shortly after all of the mixed and catalyzed monomers have been added to the vessel, the reactions will have been completed.

The initial choice of operating with a heel of solvent or with a heel of uncatalyzed monomers depends on whether or not one wants the finished reaction mass to be free of solvent. Where one wants to use the finished mass as a component of coating compositions when it is preferable to start with a heel of solvent(s), the latter being selected so that the finished reaction mass will have the desired solids content and will contain only solvents which are useful in the intended finished coating composition.

It will accordingly be understood that the polymerization of the catalyzed monomers can yield a product of 100% solids on one hand (by starting with a heel of uncatalyzed mixed monomers), or on the other hand can yield a solution having any desired solids content such as from about 40% to 100%, preferably 50-90%. For our preferred coating compositions we prefer to start with a heel of xylene having a weight such that the finished solution has a solids content around 75%. Such a solution can be combined directly with the resinous epoxy ether esters to make a blended partly-finished coating composition.

THE FINISHED MIXTURE

To prepare finished mixtures of the invention the separately prepared resinous epoxy ether esters and the separately copolymerized acidic acrylate component are mixed together, usually along with added volatile inert solvents so as to prepare a solvent blend having a solids content between about 20% and 80%, preferably 30-80%. We especially prefer a solids content around 50%. While the solvent(s) in said blend can consist entirely of aromatics, we generally find it desirable to include polar solvents such as ethers, ketones, alcohols, esters, nitroparaffins, etc. A mixture of solvents composed of about equal quantities of butanol and xylol has been found useful where the solids content of the solvent blend is around 50%. A mixture of xylol and butyl acetate is also very useful in coating compositions of the invention. However, such mixtures of aromatic and polar solvents are not a requisite except where a solids content below about 50% is sought. Aliphatic solvents should, of course, be avoided because of their general incompatibility with the resinous components of the blended mixture of resinous products.

The amounts of epoxy ether esters and acidic acrylate component in the blend or mixture should be such that the carboxyl groups in the latter component are stoichiometrically equivalent to between about 0.8 and 1.2 epoxy groups in the epoxy ether esters. We prefer however to use about one equivalent of carboxyl group per epoxy group in the mixture.

BAKING

To cure the mixed resinous products of the invention, whether they be a mixture of the pulverized resinous products or be a solvent blend, it is necessary to bake the mixture, usually after adding appropriate baking catalysts(s) described hereinafter. Where catalyst is present, baking can be effected at temperatures between about 275° F. and 400° F., the baking time and temperature depending on the kind, amount and activity of the baking catalysts(s) employed. The latter can be present in amounts between about .01% and 1%, preferably 0.1%–0.9%, by weight of the resin solids. The mixtures or blends can be cured without catalyst(s) by baking at temperatures above 400° F.

For stability certain catalysts do not need to be added just prior to baking since we have found that in some instances the catalysts can be added to a finished coating composition by the coating manufacturer. For example, triethanolamine is an effective baking catalyst, and coating compositions catalyzed with this amine have been found to possess a pot life in excess of two months. Methyl benzyl dimethylamine gives a pot life of about two weeks.

BAKING CATALYSTS

Very effective baking catalysts are found in a variety of compounds having nitrogenous character, but non-nitrogenous catalysts such as boron trifluoride can also be used effectively. The following list exemplifies the list exemplifies the nitrogenous catalysts but does not restrict the invention to their exclusive use:

$C_2$–$C_8$ alkanolamines, e.g. triethanolamine.*
Diamines, e.g. ethylene diamine.
Tertiary amines, e.g. dimethyl benzyl amine,* dimethyl amine substituted with the alkyl radical(s) of acids found in oils of the coconut oil group; methyl benzyl dimethylamine,* hydroxy ethyl morpholine, methyl benzyl diethylamine, triethanolamine borate * (especially useful at temperatures above 350° F.), di(2-ethyl hexyl) ethanolamine, methyl diethanolamine, n-butyl diethanolamine, n,n-dibutyl ethanolamine, ethyl diethanolamine, di-isopropyl ethanolamine, phenyl methyl ethanolamine, dimethyl amino propylamine,* diethyl amino propylamine,* triethyl amine.

Amine oxides such as lauryl dimethyl amine oxide and cetyl dimethyl amine oxide, Primary monoamines, such as ethyl amine, diethyl amino propylamine, dimethyl amino propyl amine, N-aminopropyl morpholine, N-amino-ethyl ethanolamine.

Secondary amines, e.g. diethanolamine and di-2-ethylhexyl amine.

Boron trifluoride/amine complexes, e.g. those disclosed in U.S. Patent 2,717,885, the disclosure of which is here incorporated by reference.

Adducts, e.g. (a) 3-butoxy-2-hydroxy-propyl diethylaminopropyl amine,* a reaction product of one mole butyl glycidyl ether with one mole diethyl aminopropyl amine, thus:

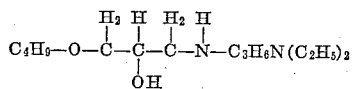

(b) 3 - alloxy - 2 - hydroxypropyl diethylaminopropyl amine,* a reaction product of one mole allyl glycidyl ether with one mole diethyl aminopropyl amine thus:

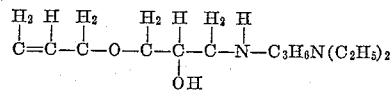

(c) di (3-butoxy-2-hydroxypropyl) diethylaminopropyl amine,* a reaction product of one mole diethyl aminopropyl amine with 2 moles butyl glycidyl ether thus.

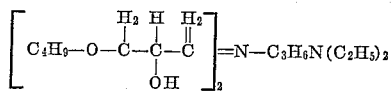

(d) di (3 - butoxy - 2 - hydroxypropyl) dimethylaminopropyl amine,* a reaction product of one mole dimethyl aminopropyl amine with two moles butyl glycidyl ether:

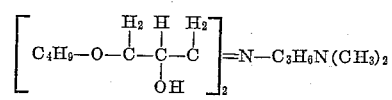

(e) di (3-butoxy-2-hydroxypropyl) ethylamine,* a reaction product of one mole ethylamine with two moles butyl glycidyl ether, thus:

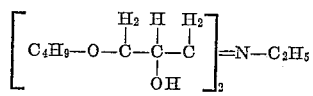

(f) tetra (3-butoxy-2-hydroxypropyl) ethylene diamine, a reaction product of one mole ethylene diamine with four moles butyl glycidyl ether, thus:

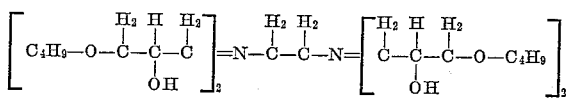

(g) di (3-allyloxy-2-hydroxypropyl) diethylaminopropyl amine, a reaction product of diethyl aminopropyl amine with two moles allyl glycidyl ether, thus:

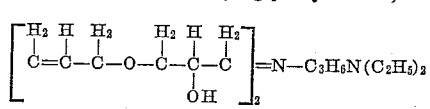

(h) reaction product of one mole hydrogenated tallow monoamine with two moles butyl glycidyl ether;
(i) reaction product of diethyl amine with one mole butyl glycidyl ether, thus:

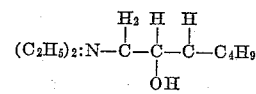

Quaternary ammonium compounds, e.g. trimethyl ammonium hydroxide substituted with the alkyl radical(s) of fatty acids of the oils of the coconut oil group, or the salts of such hydroxides, e.g. the acetate, the hydrochloride etc.; di-isobutyl phenoxy ethoxy ethyl dimethyl benzyl ammonium chloride (Rohm and Haas, "Hyamine 1622").

Methyl dodecyl benzyl trimethyl ammonium chloride (Rohm and Haas, "Hyamine 2389").

Di-isobutyl cresoxy ethoxy ethyl dimethyl benzyl ammonium chloride (Rohm and Haas, "Hyamine 10–X).

Stearyl dimethyl benzyl ammonium chloride (Triton 400).

Mono tallow trimethyl ammonium chloride (General Mills, "Aliquat 26"). "Tallow" means alkyl group(s) of tallow fatty acids.

Di-coco di-methyl ammonium chloride (General Mills, "Aliquat 221"). "Coco" means coconut fatty acid alkyl group(s).

Di (hydrogenated tallow) dimethyl ammonium chloride "Aliquat 226." "Hydrogenated tallow" means alkyl group(s) of hydrogenated tallow.

1:1 mixture of "Aliquat 26" and "Aliquat 221."
Imidazolines having the structural formula:

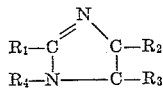

where $R_1$ is a fatty acyl radical, where $R_2$ and $R_3$ can be the same or different and are selected from the group consisting of hydrogen and alkyl radicals having up to 5 carbons, and wherein $R_4$ can be hydrogen or can be the residual radical obtained by reacting such hydrogen atom with epoxy compounds as allyl glycidyl ether, butyl glycidyl ether, phenyl glycidyl ether, styrene oxide, propylene oxide, ethylene oxide, liquid epoxy resins of the bisphenol/epichlorhydrin and/or glycerol/epichlorhydrin types. Such reaction products represent substituted ethanolamines as do the adducts, supra.

USES

The resinous epoxy ether esters and the acidic acrylate component can be powdered and the powders mixed with or without added baking catalyst to provide molding powders, adhesives, etc. However, as indicated earlier, one of the outstanding uses of the mixed resinous products, in the form of solutions in volatile organic solvents, is found in the coating field. Such solutions can be used as film-forming materials to provide either clear, pigmented or filled coatings on metals, thermosetting resins and other substrates which are capable of remaining unaffected by the baking temperatures. The films so produced, especially those cured by means of baking catalysts, can have high gloss, possess excellent adhesion, exhibit excellent flexibility and hardness, are heat-resistant up to 500° F., and exhibit good soap- and chemical-resistance. When pigmented with acid resisting pigments at pigment/vehicle ratios which retain high gloss, the catalyst-cured baked coatings are eminently useful as one-coat finishes for household and similar appliances, e.g. electric and gas space heaters, refrigerators, freezers, cooking stoves, electric irons, etc. Metallescent finishes using aluminum flake or other metal flakes as pigment are equally durable, heat resistant and attractive. In this connection it should be noted that such metallescent finishes, in the liquid form, are package-stable.

The baked films, especially the catalyst-cured films, whether clear, metallescent or pigmented with hiding non-metallic pigments have the outstanding quality of being easily touched up after having been baked to repair faults therein. This feature has already been pointed out hereinabove. Another quality of the pigmented white or pastel-colored coatings is their excellent color retention on overbaking. That is, the white coatings for instance can be overbaked without appreciable yellowing. Still another quality of all the baked coatings is their ease of being stripped from the substrate, when such stripping is desired.

In preparing pigmented coating compositions, any of the usual inert (acid resistant) pigments and/or fillers can be employed at any desired pigment/vehicle ratios. For most common purposes, however, the pigment/vehicle ratios used should desirably retain the high gloss which the baked coatings are capable of giving.

The following examples illustrate the principles of the invention and include the best modes presently known to us for practicing those principles.

EXAMPLES OF EPOXY RESIN ESTERS

*Example 1 (Epon 1001 Monococoate)*

A commercial bisphenol/epichlorhydrin epoxy resin (Epon 1001) is esterified by reacting same with methyl esters of hydrogenated coconut oil fatty acids by adding the resin and methyl esters to a kettle along with sodium methoxide. The proportions are as follows:

| | Pounds |
|---|---|
| Epon 1001 resin | 40 |
| Methyl esters of hydrogenated coconut oil acids | 10.6 |
| Sodium methoxide | .025 |

The kettle is then heated under a blanket of carbon dioxide until the contents attains a temperature of 440° F. The mass is then sparged gently with carbon dioxide and the methanol liberated by the reaction is collected and measured. When the collected methanol amounts to about 75% or more of theory, the batch is cooled and thinned with 50 lbs. of a 50/50 mixture of butyl acetate and toluol. The thinned mass then has a resin solids content of about 50%.

*Example 2 (Epon 562 Cocoate)*

A commercial glycerol/epichlorhydrin epoxy resin (Epon 562) is esterified by reacting same with methyl esters of hydrogenated coconut oil fatty acids in the manner described in Example 1. The proportions are as follows:

| | Pounds |
|---|---|
| Epon 562 resin | 130 |
| Methyl esters of hydro coconut oil acids | 120 |
| Sodium methoxide | 0.2 |

The reacted mass is thinned with 230 lbs. a 50/50 mixture of butyl acetate and toluol as in Example 1.

*Example 3 (Ricinoleic Acid Esters of Epon 1001)*

Methyl ricinoleate in an amount of 320 g. is mixed with 900 g. Epon 1001 (supra) and 1 g. sodium methoxide. The mixture is heated to 420° F. at atmospheric pressure until 30 g. methanol has been distilled off. The resulting resin esters are then cooled and reduced to 50% solids with solvent mixture composed of equal parts butyl acetate and xylol.

*Example 4 (Dehydrated Castor Oil Acid Esters of Epon 1004)*

Methyl esters of dehydrated castor oil acids in an amount of 300 g. are mixed with 1000 g. Epon 1004 (supra) and 1 g. sodium methoxide. The mixture is heated to 440° F. at atmospheric pressure until 28 g. methanol has been distilled off. The resulting resin esters are cooled and then reduced to 50% solids with equal parts of amyl acetate and xylol.

*Example 5 (Soya Oil Acid Esters of Araldite 6071)*

Methyl esters of soya oil acids in an amount of 290 g. are mixed with 900 g. Araldite 6071 and 1 g. sodium methoxide. Araldite 6071 is a bisphenol/epichlorhydrin epoxy resin having an epoxide equivalent of 450–525, and an esterification equivalent of about 130–145. The mixture is heated to 420° F. and held until 28 g. methanol has been distilled off. The resulting resin esters are then reduced to 50% solids with equal parts of butyl acetate and toluene.

*Example 6*

An acidic terpolymer is prepared from the following materials:

| | Percent by weight |
|---|---|
| Styrene | 27.5 |
| Methyl methacrylate | 8.75 |
| Butyl methacrylate | 8.75 |
| Methacrylic acid | 5.00 |
| Tert. butyl perbenzoate | .50 |
| Benzoyl peroxide | .50 |
| Xylol | 25.00 |
| N-butyl alcohol | 25.00 |

The xylol is added to a kettle and heated to 240° F. The first six ingredients listed above are mixed together outside of the kettle and slowly added to the hot xylol over a period of about one hour or as fast as the exothermic heat can be controlled. After the last of the premixture of materials has been added, the contents is held at about 240° F. for about 30 minutes, then is cooled and reduced with the butanol. The finished product has an acid value of about 64 measured on the resin solids, and has a solids content of about 50%. The thinned resin weighs about 9.6 lbs. per gallon.

*Example 7*

The following acidic terpolymers are prepared in the manner described in Example 6.

TERPOLYMER A

This is prepared from:

| | Pounds |
|---|---|
| Butyl acrylate | 50 |
| Vinyl toluene | 40 |
| Methacrylic acid | 10 |
| Xylol (solvent for heel) | 50 |
| Butanol (thinning solvent) | 50 |
| Benzoyl peroxide | 1 |

TERPOLYMER B

This is prepared from:

| | |
|---|---|
| Ethyl methacrylate | 50 |
| Vinyl toluene | 40 |
| Methacrylic acid | 10 |
| Xylol (solvent for heel) | 50 |
| Butanol (thinning solvent) | 50 |
| Tertiary butyl perbenzoate | 1 |

TERPOLYMER C

This is prepared from:

| | |
|---|---|
| 2-ethylhexyl acrylate | 50 |
| Vinyl toluene | 42 |
| Acrylic acid | 8 |
| Xylol (solvent for heel) | 50 |
| Butyl acetate (thinning solvent) | 50 |
| Tert. butyl perbenzoate | 1 |

TERPOLYMER D

This is prepared from:

| | Pounds |
|---|---|
| Ethylene glycol monoethyl ether acrylate | 50 |
| Vinyl toluene | 40 |
| Methacrylic acid | 10 |
| Xylol (solvent for heel) | 50 |
| Butanol (thinning solvent) | 50 |
| Tertiary butyl peracetate | 1 |

TERPOLYMER E

This is prepared from:

| | Pounds |
|---|---|
| 2-ethylhexyl acrylate | 50 |
| Styrene | 40 |
| Methacrylic acid | 10 |
| Xylol (solvent for heel) | 25 |
| Xylol (thinning solvent) | 75 |
| Di tert. butyl peroxide | 1 |

*Example 8*

A terpolymer is prepared from:

| | Percent |
|---|---|
| Vinyl toluene (meta and para) | 27.5 |
| Ethyl acrylate | 17.5 |
| Methacrylic acid | 5.0 |
| Tert. butyl perbenzoate | 0.5 |
| Benzoyl peroxide | 0.5 |
| Xylol | 25 |
| N-butanol | 25 |

The first five materials are mixed together outside of a reaction kettle. The xylol is aded as the sole material in a reaction kettle and is brought to a temperature of about 240° F. under a protective blanket of carbon dioxide. When the indicated temperature has been attained, the mixture of catalyzed monomers is slowly added at a rate which holds the temperature close to 240° F. After all the mixture of catalyzed monomers has been added, the mass is held at about 240° F. for a desired viscosity (usually below Z, Gardner-Holdt, 80° F.). At that time the acid value is about 64. The mass is then cooled and thinned with the butanol. The final thinned viscosity is about W–X (Gardner-Holdt, 80° F.), and the solids content is 50%.

*Example 9*

An acidic terpolymer is prepared in the manner described in Example 8 from:

| | Percent |
|---|---|
| Styrene | 27.5 |
| Butyl methacrylate | 17.5 |
| Methacrylic acid | 5.0 |
| Tert. butyl perbenzoate | 0.5 |
| Benzoyl peroxide | 0.5 |
| Xylol | 25.0 |
| N-butanol | 25.0 |

The mixture of monomers and catalysts is processed exactly as described in Example 8 to a final thinned viscosity, solids content and acid value as there set forth.

*Example 10*

An appliance enamel for use on primed refrigerator cabinets is prepared from the following materials:

| | | |
|---|---|---|
| Titanium dioxide (rutile) | lbs | 250 |
| Terpolymer of Example 9 | gals | 6 |
| Resin of Example 3 | gals | 4 |
| Ethylene glycol monoethyl ether acetate | gals | 1.5 |
| Xylol | gals | 1.5 |

Grind the above materials together in a pebble mill.

| | | |
|---|---|---|
| Terpolymer of Example 9 | gals | 2.55 |
| Resin of Example 3 | gals | 1.72 |
| Diethylene glycol monobutyl ether | gals | 2.0 |

Mix above materials and add shortly before discharging the grinding mill.

Add in order named:

| | Gallons |
|---|---|
| Ethylene glycol monoethyl ether acetate | 2.75 |
| Xylol | 1.5 |
| Terpolymer of Example 9 | 37.5 |
| Resin of Example 3 | 24.8 |
| Diethylene glycol monobutyl ether | 3.0 |
| Ethylene glycol monoethyl ether acetate | 4.75 |
| Dimethyl siloxane fluid as 10% soltuion in xylol | 0.5 |
| Shading colors | Trace |

Finished viscosity: 40–45 seconds, No. 4 Ford cup, 80° F.
Non-volatile content: 55%
For spraying reduce 15–20% with xylol (reduced viscosity 21–23 seconds, No. 4 Ford cup, 80° F.)
For curing, add 2 fluid oz. per gallon of a 15% solution of triethanolamine or diethylaminopropyl amine in xylol, and bake catalyzed coating 20 minutes at 325° F.

*Example 11*

A coating composition of about equal quality is secured from the composition of Example 10 by replacing the resin of Example 3 thereof with the resin of Example 1. The resulting coating, when cured by adding ⅛ fluid oz. per gallon of a methyl benzyl dimethylamine and baking, gives a cured film which is an excellent one-coat film over bare steel.

*Example 12*

Another excellent one-coat film over bare steel is secured from the composition of Example 10 by replacing the terpolymer of Example 9 thereof with the terpolymer of Example 6 and using as a curing catalyst the adduct "(b)," supra, added at the rate of ¼ fluid oz. per gallon.

*Example 13*

An excellent finish coat is secured from the composition of Example 10 by replacing the resin of Example 3 thereof with the resin of Example 2, to retain about the same stoichiometric ratio between carboxyl and epoxy groups.

*Example 14*

A coating of good quality is secured from the composition of Example 10 by replacing the terpolymer of Example 9 therein with the terpolymer of Example 7D.

*Example 15 (Methacrylic Acid/Methacrylate/Acrylate Terpolymer)*

Ethyl acrylate, 400 g., methylmethacrylate, 200 g., and methacrylic acid, 75 g., are mixed with 10 g. benzoyl peroxide. Ethyleneglycol monoethyl ether acetate in an amount of 250 g. is placed in a reaction vessel as a heel therein and is heated. The catalyzed mixture of acrylics is added slowly (about 45 minutes) to the heated heel to reach and maintain a temperature of about 270° F., and after all has been added the temperature is maintained at reflux for another 15 minutes. The reaction mass is then cooled and reduced to 50% solids with high-flash naphtha or other high-boiling aromatic solvent. The resulting solution can be used to replace, on a solids basis, the terpolymer of Example 9 in the coating composition of Example 10.

*Example 16*

A terpolymer was prepared in xylol in the manner described in Example 6 from the following materials:

| | Parts by wt. |
|---|---|
| Styrene | 55 |
| Ethyl acrylate | 35 |
| Acrylic acid | 10 |
| Benzoyl peroxide | 1 |

After polymerization, the mass was reduced with butanol as in Example 6.

The solution of terpolymer was blended with the resin of Example 2 in the proportions and manner shown in Example 10. The resulting coating composition was applied as a film on steel and baked 35 minutes at 330° F. The resulting cured film had good solvent resistance.

This example illustrates the low baking temperatures which can be used when the terpolymer is prepared with acrylic acid.

*Example 17.—Illustrating the Use of Triethanolamine Borate as a Curing Catalyst*

The resin solution of Example 1 is blended with the terpolymer solution of Example 6 in a 60/40 ratio. To 100 g. of the blend is added 0.5 g. triethanolamine borate dissolved in butanol. A film of the resulting solution is applied on steel and baked 20 minutes at 350° F. The baked film exhibits good cure and good solvent resistance. The blended and catalyzed solution exhibits good can-stability and can be vended as a stable article of commerce.

*Example 18.—Preparation of Adduct Curing Catalyst*

An adduct catalyst was prepared by adding 1 mol butyl glycidyl ether to 1 mol dimethylaminopropylamine as fast as the exothermic heat could be controlled to maintain a temperature of about 120° F. The resulting amine was used as the sole catalyst in curing the coating compositions of Examples 10–16, with the resulting cured film being found to exhibit good cure, durability and resistance qualities.

Having described our invention what we claim is:

1. A heat curable composition of matter particularly adapted for use in light-colored baking-type coating compositions, said composition of matter comprising as its principal film-forming and resinous material a thermohardening mixture consisting essentially of: (A) organic monocarboxylic acid esters of resinous epoxide alcohols which are polyether derivatives of epichlorhydrin and dihydric compound selected from the group consisting of dihydric phenols and aliphatic alcohols, having alternating residues of the starting materials united through ether oxygen, having intermediate hydroxyl groups and terminal 1,2 epoxy groups and being free of other reactive groups, said epoxide alcohols having been transesterified at from 12 to 100% of the hydroxyl groups with $C_1$–$C_5$ alkyl esters of aliphatic monocarboxylic acids of oils of the coconut oil group, and having terminal 1,2 epoxy groups, and (B) at least one separately-prepared, substantially fully reacted, addition-type copolymer composed of addition-type residues of (a) 5–25% by weight of at least one monocarboxylic acid selected from the group consisting of acrylic acid, alpha $C_1$–$C_6$ hydrocarbyl-substituted acrylic acid, beta $C_1$–$C_6$ hydrocarbyl-substituted acrylic acid, and mixtures thereof, and (b) balance at least one substantially neutral ester composed essentially of esterification residues of an acid selected from the group consisting of acrylic acid and methacrylic acid and 65–100% by weight of an alcohol selected from the group consisting of $C_1$–$C_{22}$ aliphatic monohydric hydrocarbyl alcohols, $C_2$–$C_8$ aliphatic polyhydric alcohols having 2–6 esterifiable hydroxyl groups, and mixtures thereof, balance alkylene glycol monohydrocarbyl ethers having 2 to 8 carbon atoms in the glycol radical and having 1 to 6 carbon atoms in the hydrocarbyl ether group thereof, polyalkylene glycol monohydrocarbyl ethers having 2 to 8 carbon atoms in the polyglycol radical thereof and 1 to 6 carbon atoms in the hydrocarbyl ether group, and mixtures thereof, said (A) and (B) components of the mixture being proportioned so that said (B) component provides between about 0.8 and 1.2 esterifiable carboxyl groups per epoxy group in said (A) component.

2. A composition of matter as claimed in claim 1 wherein the (B) component includes up to 90% by weight of the total of at least one vinyl mononuclear aromatic monomer.

3. A composition as claimed in claim 2 where the (B) component is composed of addition-type residues of about 5–12% by weight of said monocarboxylic acid, about 5–75% by weight of said substantially neutral esters, and about 19–83% of said vinyl mononuclear aromatic monomer.

4. A composition as claimed in claim 3 wherein said monocarboxylic acid is methacrylic acid and amounts to about 5–12% by weight of the total (B) component, wherein said substantially neutral esters are $C_1$–$C_4$ alkyl esters and constitute about 20–40% by weight of the total (B) component, and wherein the remainder is material selected from the group consisting of styrene and vinyl toluene.

5. A composition as claimed in claim 4 wherein the (A) component is composed of a bisphenol/epichlorhydrin epoxyhydroxy polyether alcohol esterified with hydrogenated fatty acids of an oil of the coconut oil group.

6. A composition as claimed in claim 5 wherein bisphenol/epichlorhydrin polyether alcohol of said (A) component has an epoxide equivalent of between about 425 and 1900.

7. A composition as claimed in claim 6 wherein the bisphenol/epichlorhydrin polyether alcohol of said (A) component has an epoxide equivalent of between about 425 and 450 and an esterification equivalent of between about 130 and 145, and is esterified at 25% to 75% of its available hydroxyls with acyl groups of substantially fully hydrogenated coconut oil fatty acids, and wherein said (B) component is the copolymer secured by addition-polymerization of about 10% by weight of methacrylic acid, about 17.5% by weight of butyl methacrylate, about 17.5% by weight of methyl methacrylate, and about 55% by weight of styrene.

8. A composition as claimed in claim 7 wherein said (A) and (B) components are blended together in compatible inert volatile solvent to form a homogeneous solution and vehicle having a solids content between about 20% and 80% by weight, and wherein said homogeneous solution additionally contains a small amount of at least one amine baking catalyst effective to cause an applied film of said solution to cure to a thermoset state when said applied film and the substrate thereof are baked at temperatures between about 275° and 400° F.

9. A film-forming vehicle as claimed in claim 8 which includes pigment and is a baking enamel.

10. A film-forming vehicle as claimed in claim 9 wherein said amine baking catalyst is selected from the group consisting of $C_2$–$C_8$ alkanol amines, substituted $C_2$–$C_8$ alkanolamines and quaternary ammonium compounds.

11. A film-forming vehicle as claimed in claim 10 wherein said amine baking catalyst is triethanolamine.

12. A composition as claimed in claim 1 which includes a small amount of at least one amine baking catalyst effective to cause said composition to cure to a thermoplastic state when the catalyzed composition is baked at temperatures between about 275° and 400° F.

13. A composition as claimed in claim 12 wherein said amine catalyst is selected from the group consisting of $C_2$–$C_8$ alkanolamines; diamines; tertiary amines; amine oxides; primary monoamines; secondary amines; boron trifluoride/amine complexes; quaternary ammonium hydroxides; quaternary ammonium salts; imidazolines having the formula,

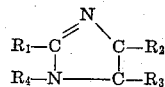

wherein $R_1$ is a fatty acyl radical, wherein $R_2$ and $R_3$ are selected from the group consisting of hydrogen, $C_1$–$C_5$ alkyl groups and mixtures thereof, and wherein $R_4$ is selected from the group consisting of hydrogen and the residual radical obtained by reacting such $R_4$ hydrogen with an epoxy compound; 3-butoxy-2-hydroxypropyl diethylaminopropylamine; 3-allyloxy-2-hydroxypropyl diethylaminopropyl amine; di (3-butoxy-2-hydroxypropyl) diethylaminopropyl amine; di (3-butoxy-2-hydroxypropyl) dimethylaminopropyl amine and di (3-butoxy-2-hydroxypropyl) ethylamine.

14. A composition as claimed in claim 13 wherein said amine catalyst is diethylaminopropyl amine.

References Cited in the file of this patent

UNITED STATES PATENTS

| | | |
|---|---|---|
| 2,604,464 | Segall et al. | July 22, 1952 |
| 2,684,345 | Yuska et al. | July 20, 1954 |
| 2,798,861 | Segall et al. | July 9, 1957 |
| 2,877,195 | McNabb | Mar. 10, 1959 |
| 2,883,308 | Yamada et al. | Apr. 21, 1959 |
| 2,908,663 | Masters | Oct. 13, 1959 |

FOREIGN PATENTS

| | | |
|---|---|---|
| 793,776 | Great Britain | Apr. 23, 1958 |
| 465,107 | Canada | May 16, 1960 |
| 532,412 | Canada | Oct. 30, 1956 |